Feb. 3, 1925. 1,525,258
E. TRAUB
VALVE CASING CAP AND MANUFACTURE THEREOF
Filed June 19, 1924

INVENTOR
Emil Traub
BY
ATTORNEY

WITNESSES

Patented Feb. 3, 1925.

1,525,258

UNITED STATES PATENT OFFICE.

EMIL TRAUB, OF NEWARK, NEW JERSEY.

VALVE-CASING CAP AND MANUFACTURE THEREOF.

Application filed June 19, 1924. Serial No. 721,027.

*To all whom it may concern:*

Be it known that I, EMIL TRAUB, a citizen of the United States, residing at Newark, in the county of Essex and State of New Jersey, have invented certain new and useful Improvements in Valve-Casing Caps and Manufacture Thereof, of which the following is a specification.

This invention relates to improvements in valve-caps primarily for valve-casings of inflated tires of vehicles such as automobiles and the like and has for its primary object to provide a simple form of valve-cap which will reliably prevent untimely egress of the tire-inflating fluid and which may be manufactured at a relatively reasonable cost comparatively to its efficiency.

In a preferred embodiment of the invention the present improved cap is as usual provided with a cavity, the cylindrical defining wall of which is threaded for a portion of its length for application of the cap to the tire valve-casing, while an unthreaded portion of the cavity-defining wall adjacent the base thereof constitutes an insert-chamber of slightly larger diameter than the threaded portion of the cavity, whereby a retaining shoulder is provided adjacent the inner end of the threads for a sealing insert or washer. In the present invention, means is provided for inserting and retaining a lubricant between the insert and the cavity base, which latter is of a novel construction particularly lending itself to insertion and retention of the lubricant.

The invention further comprehends the method of converting a soft-metal slug preferably of spherical outline, but which may be of a cylindrical or similar shape into a sealing-insert of the desired outline by the action of a reciprocable tool.

Figure 1:
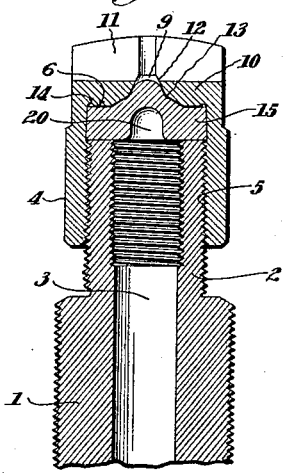
Figures 2, 3:
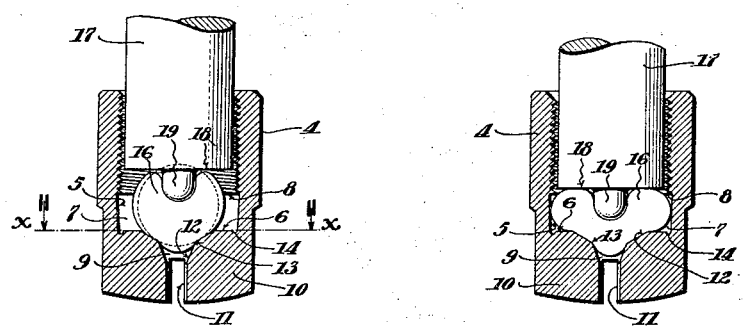
Figure 4:
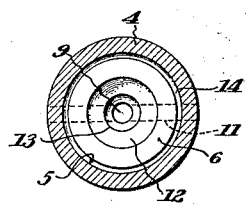

In the accompanying drawings, Fig. 1 is a longitudinal section of a portion of a tire valve-casing and the present improved cap applied thereto. Figs. 2 and 3 illustrate successive steps in the method of converting a soft-metal slug into a valve-casing sealing insert. Fig. 4 is a sectional view substantially on the line x—x of Fig. 2.

In the drawings there is illustrated a common type of tire-valve casing 1 provided with an exteriorly and interiorly threaded reduced end 2, this casing having the usual central bore 3 for the reception of the valve proper (not shown) which may be of any suitable or well known construction. In order to seal the reduced end of the valve-casing against untimely egress of the tire-inflating fluid and to prevent entrance to the valve parts of dust and grit, there is provided a casing-cap 4 of novel construction.

The cap 4 comprises a socketed body providing a cavity defined by a cylindrical wall 5 threaded from its outer end for a portion of its length for application to the reduced end 2 of the valve-casing. This cavity terminates in a base 6 adjacent which the cylindrical wall 5 is left unthreaded to provide an insert chamber 7 having a diameter greater than that of the threaded portion of the cavity, whereby there is provided an annular insert-retaining shoulder 8 between the insert chamber and the threaded portion of the cavity.

The base 6 of the insert-chamber portion of the cap-cavity is provided with a substantially central conical aperture 9, extending through the head 10 of the cap and terminating in a transverse screw-slot 11 formed in said head. The wall 12 defining the aperture 9 is inclined at sharply defined successively different angles with respect to a cap-cavity diameter, i. e., the aperture 9 has its greatest diameter where it merges into the base 6, the aperture wall thence converging very rapidly for a portion of its length and to a point 13 from which the angle of inclination of the wall is greater. This construction facilitates manufacture of the inwardly flaring aperture 9, the function thereof being hereinafter set forth together with that of an annular lubricant-retaining groove 14 formed in the base 6 at its juncture with the wall 5.

The valve-casing sealing insert 15 is formed from a soft-metal slug 16 preferably of spherical form but which may also be cylindrical or of similar shape. This slug 16 is dropped within the cap-cavity, being centralized by the walls of the flaring aperture 9. A tool 17, which may be reciprocated by any well known means, is employed to press the slug into the desired shape. This tool 17 is preferably of cylindrical outline, having a flat end-face 18. Projecting centrally from the end-face 18 is a rounded teat 19 which initially bears upon the slug inserted within the cap and presses a portion of the slug into the aperture 9, thereby forming a depression 20 in the slug to provide a valve-stem clearance. The flat end-face 18 thereupon engages the slug adjacent the depression 20 and by pressing it against the base 6, the slug-material is flattened upon its opposite faces, thereby producing a peripheral bulge which is formed into cylindrical shape by the cavity-wall 5 and retained within the chamber by the shoulder 8. The size of the slug 16 is such that the thickness of the shaped insert 15 between its opposite flat faces is slightly less than the distance between the base 6 and the shoulder 8 to provide a lubricant clearance between the base and the insert.

A lubricant may therefore be inserted through the aperture 9, which lubricant serves to anti-friction the contact between the base 6 and the insert 15, whereby in applying the cap to a valve-casing, the cap is free to rotate relatively to the insert to avoid cutting away a portion of the insert-metal, i. e., the insert is pressed against the end of the valve-casing without rotation of the insert after making contact with the end of the casing. There is no question as to the sealing effect of the soft-metal when pressed firmly against the end of the valve-casing and the present improved anti-friction device increases the effective life of the insert.

The annular groove 14 constitutes lubricant retaining means in that it serves somewhat in the capacity of a lubricant reservoir and may, if desired, be packed with a lubricant before inserting the slug 16, although it will evidently store a portion of the lubricant inserted through the aperture 9.

The wall of the aperture 9 is inclined in the manner described so that after the slug 16 has been shaped into the insert 15, the increasing clearance provided by the relative inclines of the aperture wall in the direction of the insert-chamber will permit of a dislodgment of the dome from engagement with said aperture wall by inserting an implement in said aperture through the slot 11 of the cap-head and bearing down upon the insert to simultaneously therewith provide a complete lubricant clearance between the base 6 and the insert 15.

Having thus set forth the nature of the invention, what I claim herein is:—

1. A valve-casing cap provided with an insert-chamber having a base formed with a lubricant-retaining groove and a valve-casing sealing insert disposed within said chamber contiguously to said base.

2. A valve-casing cap provided with an insert-chamber bounded by a cylindrical wall and a base, said base being formed with an annular lubricant-retaining groove at the juncture of said base and wall, and a valve-casing sealing insert disposed within said chamber contiguously to said base.

3. A valve-casing cap provided with an insert-chamber defined by a base bounded by a cylindrical wall, said base having a substantially central inwardly-flaring aperture and being provided adjacent said wall with a lubricant-retaining groove, and a domed casing-sealing insert of soft-metal disposed within said chamber, the dome of said insert projecting within said aperture.

4. A valve-casing cap comprising a body provided with an insert-chamber having a base formed with a substantially central inwardly-flaring aperture extending through the cap-body, the aperture wall being inclined at sharply defined successively different angles, and a domed soft-metal sealing-insert disposed within said chamber, the dome of said insert being inclined correspondingly with the inclinations of said aperture-wall.

5. A valve-casing cap comprising a body provided with an insert-chamber having an insert-seating base, a soft-metal casing-sealing insert disposed within said chamber contiguously to said base, said chamber having lubricant-retaining means to provide an antifriction bearing for said insert upon the base of said chamber.

6. A valve-casing cap provided with an insert-chamber having a base and an insert-retaining shoulder spaced therefrom, a soft-metal casing-sealing insert disposed in said chamber to provide a lubricant clearance between the base and said insert, said chamber being provided with lubricant retaining means.

7. A valve-casing cap provided with a cavity having an insert-chamber defined by the cavity-base, the cylindrical wall of said cavity and an insert-retaining shoulder provided in said wall, said base having a substantially central tapered aperture flaring toward said chamber, the base having a lubricant retaining groove adjacent its juncture with said cavity wall, and a soft-metal casing-sealing insert disposed within said chamber.

8. The method of providing a socketed valve-casing cap with a sealing-insert comprising inserting a soft-metal slug within the cap-cavity and compressing said slug against the cavity-base by a tool designed to centrally dome the insert and cause a peripheral bulge thereof into cylindrical shaping engagement with the cap-cavity wall.

9. The method of providing a socketed valve-casing cap with a sealing-insert, comprising inserting a soft-metal slug within the cap-cavity and compressing said slug against the cavity-base by means of a tool having a substantially flat end face and a teat projecting centrally therefrom, the compression of the insert-metal causing a peripheral bulge thereof whereby it assumes the outline of the cavity wall and whereby a central valve-stem clearance depression is formed in the insert.

10. In the manufacture of a valve-casing cap having an insert-chamber defined by a cylindrical wall, an insert-seating base and an insert-retaining shoulder on said wall, together with a soft-metal valve-casing sealing-insert disposed within said chamber, of the method of forming and seating said insert within the chamber comprising forming an inwardly flaring recess substantially centrally of the base of said chamber, inserting a soft-metal slug within the chamber in centralized position determined by said recess, and pressing said slug by a tool shaped to dome a portion of said slug within said base-recess and press said slug into cylindrical-shaping engagement with said cylindrical wall between said shoulder and base.

11. In the manufacture of a socketed valve-casing cap provided with a valve-casing sealing insert, the method of providing the cap-base with an aperture extending through the cap-head into the cap-cavity, inserting a soft-metal slug within said cavity, compressing said slug to dome a portion thereof within said aperture and flatten the opposite faces of said slug to cause a peripheral bulge thereof into cylindrical shaping engagement with the cavity wall, and dislodging the insert from the cavity-base and base-aperture to provide a lubricant clearance therebetween.

In testimony whereof I affix my signature.

EMIL TRAUB.